July 21, 1964  E. M. BURDICK  3,141,832
METHOD OF CULTIVATING PAPAYA PLANTS AND FOR RECOVERING
PROTEOLYTIC ENZYMES FROM PAPAYA PLANTS
Filed Jan. 7, 1960
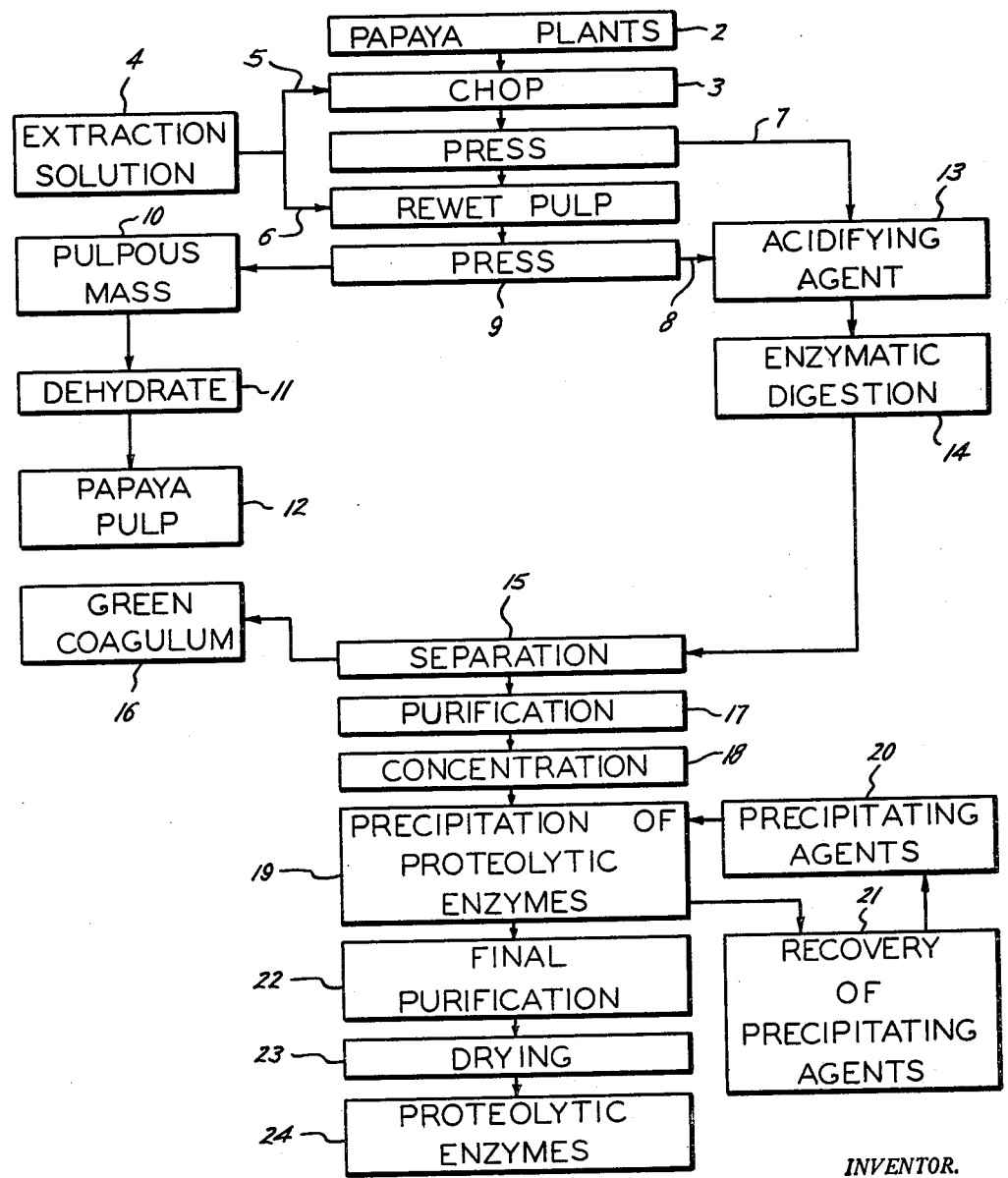
INVENTOR.
Everette M. Burdick
BY
ATTORNEYS United States Patent Office 3,141,832
Patented July 21, 1964

3,141,832
METHOD OF CULTIVATING PAPAYA PLANTS AND FOR RECOVERING PROTEOLYTIC ENZYMES FROM PAPAYA PLANTS
Everette M. Burdick, 4821 Ronda St., Coral Gables, Fla.
Filed Jan. 7, 1960, Ser. No. 1,050
22 Claims. (Cl. 195—66)

The present invention relates to a method of cultivating papaya plants and to a process for recovering proteolytic enzymes from papaya plants.

The most important commercial product obtained from papaya is Papain. Papain acts in a manner similar to the better known animal pepsin digestive ferment, but it is superior to pepsin and other animal proteolytic enzymes in that it is effective over a wider pH range and resists higher temperatures before becoming inactivated. These unique properties make papain the proteolytic enzyme of preference for many industrial applications such as, clarifying and stabilizing beer, tenderizing meats, bating hides, treating wool and silk textiles, cheese manufacturing and in pharmaceuticals.

The papaya plant (Carica papaya) thrives throughout the tropics and can be satisfactorily cultivated in certain parts of the United States such as in Florida, Texas and California. All parts of the papaya plant have supplied primitive people for a substantial period of time with medicines, fibers, detergents, and so on, but it is primarily grown for the papaya fruit which may be eaten. The mature fruit, which is melonlike, supplies a fair share of the caloric, mineral and vitamin requirements of tropical diets but by far the most important commercial product of the papaya fruit is papain which is simply the dried latex of the green immature papaya fruit.

At the present time the general method of producing papain from green fruit of the papaya plants is as follows. Papaya seeds are planted in nurseries and then transplanted when about one month old, or when they are 3 or 4 inches high. Often several seeds are planted directly in a field hole where the tree is wanted thereby eliminating transplanting, but it is necessary, when this procedure is followed to thin the plants at a later date. The plants are normally spaced about 6 to 10 feet apart, which generally gives some 300 to 500 trees per acre.

When the sex of the trees can be determined definitely, they are thinned so that a single tree is left in each hole, and it is desirable to leave about one male tree to each 30 or 50 female trees. The best papaya plants for producing papain are normally dioecious, that is, the male and female flowers are on separate plants. It is desirable, if not important, to have as many female or fruit producing trees as possible and yet have good pollination, since it is the green papaya fruit that is tapped and from which the latex is obtained. Weed cultivation may be practiced and fertilizer as necessary must be applied to maintain satisfactory fruit and latex production. Commercial plantings may be subject to insect damage and various diseases which are ordinarily not found when papayas grow in their native state or wild, and these difficulties must be overcome by the use of expensive insecticides, fungicides, and cultural practices.

About eight months after transplanting, the papaya plants have produced immature fruit which are ready for tapping; however, this time may vary considerably depending upon many factors. The fruit is tapped by making cuts or incisions running the full length of the fruit, and the number of cuts depends upon the size of the fruit, but generally consists of from 2 to 5.

The number of incisions is not important, and some plantation operators prefer more or fewer incisions. Once the incisions are made the latex flows freely for only a few seconds and then coagulates. The latex may be collected directly in a small container held by the tapper, but more commonly it is allowed to drip onto an inverted umbrella or tray fastened around the trunk of the tree. From time to time the partially dried and coagulated latex is scraped from the umbrellas and taken to the drying shed where it is spread out on drying racks. These racks are then placed in the kiln where heated air is made to circulate over them until the papain is thoroughly dried. When the drying operation is finished the papain crum is then packed in tin containers.

Due to the economic factors involved, Africa and Ceylon are the principal sources of papain, and it can be observed that the manner of cultivation and collection of the papain from the immature fruit involves the most primitive, and unsanitary methods which are directly responsible for many serious defects and limitations in papain which is available on the market today.

It is not uncommon for imported crude crum papain to be highly contaminated with insects and other filth due to the above primitive method of collecting the papain, which makes most of the imported papain unsuitable for food and pharmaceutical use without further refining.

Also, papain offered on the market at the present time lacks uniformity in color, the color ranging from a dark brown to almost white—the lighter the color the better the grade in general, and enzymatic activity, which is the most important property of the papain also lacks uniformity.

In addition, papain commercially available today likewise lacks good solubility, and is unstable on storage as well as possessing a disagreeable odor. The present invention relates to a new method of cultivating papaya plants and for recovering the valuable proteolytic enzymes and other valuable constituents from the plant without the necessity of producing papaya fruit.

The present invention provides a method of cultivating papaya whereby the desirable constituents thereof may be recovered in a clean, sanitary manner.

Another object of the present invention is to provide a method of cultivating, harvesting and processing of immature green papaya plants in order to obtain the valuable constituents from the plants without the necessity of tapping the fruit of the papaya.

Yet a further object of the present invention is to provide a method of processing the immature papaya leaves, stems and trunks for the production of papain.

Yet a further object of the present invention is to provide a process of producing papain having uniformity of color, uniformity of enzymatic activity, and which possesses desirable odor as well as solubility and stability characteristics.

Another object of the present invention is to provide a method of producing a high grade sanitary papain that can be used directly in foods and pharmaceuticals.

Another object of the present invention is to provide a method of producing papain as well as providing a source for other products such as animal feedstuffs, chlorophylls, carotenes, xanthophylls, phytol, and carpaine.

The present invention relates to a new method of growing papaya plants thickly planted and harvested mechanically while immature in a manner so that the roots may put out new tops indefinitely, which immature papaya plants may thereafter be treated for extracting the valuable products therefrom.

The present invention also relates to a process of recovering enzymes and other valuable constituents from immature papaya plants in a manner which preserves, protects, activates and otherwise liberates the desirable constituents from the plants.

Yet a further object of the present invention is to provide a process for recovering proteolytic enzymes from immature papaya plants in a manner so as to protect the enzymes from certain natural enzyme inhibitors present, and more specifically, to a treatment of the immature plants under controlled conditions of pH, time, and temperature, so as to preserve, protect and activate the recovered proteolytic enzymes.

Yet a further object of the present invention is to provide a method of recovering proteolytic enzymes from immature papaya plants thereby eliminating the necessity of obtaining the proteolytic enzymes from the green immature fruit of the plants.

Still a further object of the present invention is to recover proteolytic enzymes from immature papaya plants, and to provide an animal foodstuff from the processed plants which contains a relatively high protein content and a relatively low crude fiber content.

Still a further object of the present invention is to provide a method of recovering papain wherein the papain recovered is uniform in color and is uniform in enzymatic activity as well as having desirable solubility characteristics and which is stable over a long period of storage.

Other objects and advantages of the present invention will become more apparent from a consideration of the following description and schematic flow sheet.

I have discovered that extremely large yields of a suitable source of papain may be obtained by planting papaya seeds at a rate of 10,000 to 50,000 per acre. For example, the seeds may be planted every foot in rows 1 foot apart, thereby making it possible to obtain about 40,000 plants per acre.

When the plants are about 2 to 3 feet tall, they are harvested mechanically, as by a conventional forage harvester, and by cutting the green immature papaya plant trunks at a height of 9 to 12 inches above the ground, the roots will put out new tops rapidly.

Under good growing conditions, it is thus possible to make three or four cuttings per year for several years before it becomes necessary to replant the seeds. The present invention utilizes the green immature plants as a source of desirable constituents, and it can be appreciated that the above procedure eliminates the time consuming and expensive techniques heretofore used in cultivating papaya plants. Also, since the green immature papaya plants including the leaves, stems and trunks are used for the production of papain and other constituents, it can be appreciated that the problems involved in waiting on the plant to flower, and in tapping the plant used in present-day procedures are overcome.

As the plants are harvested it is advisable to spray the chopped plants with a small quantity of preserving solution. The preserving solution may comprise a mixture of ammonia, sulphites and sulfides in the amount of 0.1% of each by weight. This concentration may vary without departing from the scope of the invention but is naturally restricted by economic factors. Also, the pH of the spraying solution should be slightly alkaline or neutral, and a pH range of 7 to 9 is quite satisfactory.

It is not necessary to spray the plants as they are harvested, but the yield of papain and the activity of the papain obtained from chopped plants when they are not sprayed may be reduced.

It should be further noted that while the present invention is described in detail as being particularly applicable to the recovery of constituents from green immature papaya plants, it should be noted that it may be profitable to process mature or older papaya plants that have been raised primarily for fruit. The process works equally well on older plants; however, the young immature plants are preferred for several reasons. First of all, they are more succulent, which makes them easier to chop and press in machinery both in the field and in the processing plant. Secondly, the enzyme yield per acre is generally far greater than when older plants are used. Attention is now directed to the schematic flow diagram and it will be noted that the harvested plants represented by the numeral 2 after harvesting are chopped or macerated as illustrated at 3. After chopping the plants are treated with a small quantity of extraction solution to thoroughly wet all the surfaces of the plants, especially the freshly cut or exposed surfaces to prevent undesirable effects of oxidation and enzyme inactivation. This may be done in any suitable manner and is most simply accomplished by spraying the chopped plants with the extraction solution; however, it may be accomplished also by dipping the chopped pieces into the extraction solution.

The extraction solution includes a chemical constituent or constituents which perform the function of a reducing or anti-oxidizing agent, a papain activator, and a solubilizing or peptizing agent. It is necessary to provide a papain activator, and highly desirable to also have a reducing agent and peptizing agent.

Among the reducing or anti-oxidizing agents which have been found suitable there are the sulfites and bisulfites of sodium and potassium, sulfur dioxide, the sulfides and hydrosulfides of ammonium, sodium and potassium, hydrogen sulfide, glutathionine, methionine, cysteine, thioglycolates and cyanides. Out of this group, the sulfites and bisulfites of sodium, and hydrosulfides of ammonium and sodium are preferred.

Among the papain-like enzyme activators which have been found suitable, there are the sulfites of sodium and potassium, the sulfides of sodium and potassium, the bisulfites of sodium and potassium, hydrosulfides and sulfides of ammonium, sodium and potassium, certain metal chelating agents (versene, sequestrene) like diethylenetetra amino acetic acid and its soluble salts, hydrocyanic acid and its sodium and potassium salts. Among this group, the sulfides of sodium, the bisulfites of sodium, hydrosulfides of ammonium and diethylenetetra amino acetic acid and its soluble salts are preferred.

Among the solubilizing or peptizing agents, the following are desirable—chlorides of sodium and ammonium, phosphates of sodium and potassium, various meta- and polyphosphates of sodium and potassium, sodium citrate, hydrotropic agents such as sodium benzene sulfonate and sodium paracymene sulfonate. Among these, the chlorides of sodium and ammonium, polyphosphates of sodium, and sodium citrate are preferred. Also, sodium sulfite, the bisulfides and sulfides of ammonium, and sodium, and ascorbic acid and its soluble salts are quite satisfactory. Generally speaking, any dilute salt solution will function satisfactorily.

Concentration of the chemicals may be in the neighborhood of 0.1% by weight, and concentrations in the range of 0.1% to 0.25% by weight are satisfactory. Lower concentrations are ineffective and higher concentrations are not necessary to accomplish the results.

After the chopped mass of green papaya plants has been thoroughly moistened, they are next pressed to separate a liquor or liquid from the pulpous mass of the papaya plants. The pressing may be accomplished by any suitable apparatus, such as a filter press or the like to separate the liquid from the pulp.

It is desirable to rewet the pulpous mass with the extraction solution in order to extract more of the proteolytic enzymes and other constituents and this may be done by adding to the wet pulp a volume of the extraction solution about equal to the volume of liquid obtained in the first pressing operation. The rewet pulp is then pressed as before to obtain a second portion of liquor and the resulting pulpous mass.

The pulpous mass may be dehydrated in a conventional dehydration kiln to make papaya pulp which can be used as an animal feedstuff which contains a good amount of protein, and is quite rich in carotene or provitamin A. In the flow sheet the extraction solution is illustrated by the numeral 4 and it can be seen that it is added as illustrated at 5 to the chopped papaya plants and is added as illustrated at 6 to the rewet pulp.

After the pressing to separate the liquid from the pulp, the pressings yield 75 to 90% of the total. The liquids are combined as illustrated at 7 and 8 for subsequent processing. The pulpous mass obtained from the press 9 is represented at 10 and as noted above is dehydrated at 11 to produce the animal feedstuff represented by the numeral 12.

The two pressings of the plants yield 75% to 90% of the total enzyme activity available from the plants and while more rewettings and pressings give higher yields of enzymes, the purification difficulties of the enzymes later in the process appear to be increased.

Of course, the number of rewettings and pressings may be varied as desired.

The combined liquors or liquids from the pressing may be green in color and may have a pH in the neighborhood of 8. At any event, regardless of the color and regardless of the pH, the pH of the liquid is adjusted to between 4.0 and 4.5 by the addition of an acidifying agent as represented by the numeral 13 in the drawing. The acidifying agent may be hydrochloric acid, sulfuric acid, citric acid, acetic acid, or phosphoric acid.

After the pH of the liquid has been adjusted, the temperature is carefully raised to between 40° and 55° C. In this regard it should be noted that any localized overheating of the liquid will tend to destroy the proteolytic enzyme activity. Papain, like all enzymes, is destroyed by heat, but at temperatures below 55° C., the rate of destruction is quite low while at higher temperatures the rate of destruction increases rapidly. The heating of the liquid effects enzymic digestion which liberates and otherwise activates the proteolytic enzymes and at the same time causes a coagulation of the protein impurities.

The enzymic digestion is continued until proper coagulation has been obtained, and I have determined that the time required to produce the desired results usually is between 10 and 30 minutes depending upon the particular papaya plants from which the liquids were obtained. In this regard, if the temperature of the liquid is raised carefully and uniformly, the coagulation will be effected at the lowest possible temperature thereby producing the most active papain from the plants. Once the coagulate has been formed, the coagulate can be separated from the liquid by any suitable means such as filtration, centrifugation, or simple settling. The formation of the coagulate may be termed a "break" which is clearly visible to the eye in that the liquid seems to curdle and separate into coagulum which may be green in color and a clear solution. Of course, any suitable instrumental means may be used to determine the occurrence of this phenomenon.

Since the coagulate is mainly protein, it may be advisable to add some filter aid at this point in order to effect more rapid filtration and optimum clarification of the liquid. The clarified liquid can be further purified by treatment with activated carbons and/or filter aids to produce a relatively sparkling clear solution or liquid, which may then be concentrated from their 3 to 5% solids content to some 30 or 50% solids content by means of vacuum concentration. In this regard, it should be again noted that temperatures above 55° C. should be avoided to prevent loss in enzymic activity.

In the flow diagram the enzymatic digestion is represented by the numeral 14 and the separation at 15. The coagulate illustrated at 16 is a rich source of chlorophylls, carotenes, xanthophylls, carpaine, and protein. If desired, the protein may be separated from the coagulate 16 and added back to the papaya pulp feedstuff represented by the numeral 12. The clear liquid separated from the coagulate is illustrated at 17 as being purified as noted above, and concentrated as illustrated at 18 and as noted hereinabove.

After the liquids have been purified and concentrated, the proteolytic enzymes may be separated therefrom by standard procedures. For example, the proteolytic enzymes can be precipitated by salting-out agents and by certain water miscible organic solvents. The latter produces a better product in that it is purer, while the former seems to be more economical, and either may be used in the production of various grades of proteolytic enzymes from papaya plants as necessary.

Precipitation of the proteolytic enzymes from the clarified concentrated syrup may be most readily effected by means of ammonium sulfate. This is most conveniently done by adding about two volumes of a saturated ammonium solution per each volume of concentration solution. Solid ammonium sulfate can be used, the important thing being that a final concentration of 60% to 70% saturation, with respect to ammonium sulfate, must be achieved. Lower concentrations of ammonium sulfate may be used to purify further and to refine the enzymes present. The precipitated enzymes can be separated from the mother liquors by simple filtration. If it is desirable to eliminate all traces of the bitter tasting alkaloid carpaine, the precipitated enzymes should be washed with a suitable organic solvent, such as toluene, before drying. As noted on the flow sheet, the enzymes are precipitated as represented at 19 by the addition of precipitating agents 20, which precipitating agents are recovered at 21 for reuse as noted in the flow sheet.

The ammonium sulfate can be recovered from the liquid for reuse as a precipitating agent, or as a very valuable fertilizer.

Precipitation of the proteolytic enzymes from the clarified concentrated syrup can also be effected by certain water miscible organic solvents such as, methanol, ethanol, isopropanol, and acetone, which have all been found to be quite effective. In this regard, it should be noted that it is necessary to add sufficient solvent to the concentrated enzyme solution to produce an organic solvent concentration of about 70% whereupon a flocculent precipitate forms which may be separated, washed with fresh solvent and finally dried to produce high quality proteolytic enzymes. I prefer to use acetone since recovery for reuse is quite simple by distillation. The use of water miscible organic solvents to precipitate the proteolytic enzymes has another distinct advantage of permitting the recovery of the mother liquid syrup which is the rich source of the papaya alkaloid carpaine, and valuable nutrients which can be added back to the papaya pulp feedstuff.

As noted at 22, the proteolytic enzymes may be subjected to the acetone purification noted hereinabove if desired, and thereafter it may be dried by any suitable means as represented at 23 to produce the proteolytic enzyme product represented at 24.

To further amplify and describe the present invention the following examples are given:

*Example 1.*—A single young papaya plant about 2 feet tall was cut about 10 inches above the ground. The entire plant, consisting of trunk, leaves and stems, weighing 675 grams was chopped in simple food chopper fitted with a tapered screw. The pulpous mass thus produced, along with all expressed liquor, was placed in a cloth bag and then in a stainless steel fruit press provided with a hand operated screw to produce pressure. About 300 milliliters of green press liquor was obtained. The pulpous mass was rewet with 300 milliliters of extraction solution containing 0.3 gram of sodium metabisulfite, 0.3 gram of tetrasodium diethylenetetraamino acetate, and 0.3 gram of trisodium phosphate. After mixing in well the rewet mass was again passed through the food chopper. The rewet mass was placed in the cloth bag and pressed as before. Some 320 milliliters of green press liquor was obtained. The pulpous mass was dried in an oven to make about 130 grams of papaya pulp, which contained some 14% crude protein and 182,000 International Units of pro-vitamin A per pound. The green liquors were combined and subjected to the following enzymatic digestion. The original pH of 7.9 was lowered to 4.2 by adding citric acid. Heat was applied to raise the temperature slowly from room temperature up to 35° C., this took about 15 minutes and the solution was agitated slowly. A slight break or separation of the green coagulum could be seen. Heating and agitation were continued for about 20 minutes more, by which time the temperature had reached 45° C. and the green coagulum had clearly separated. Filter aid was added and the green coagulum was recovered by filtration. A straw colored filtrate was obtained, which was further purified by treating with activated carbon and again filtered. The almost colorless purified solution was concentrated in a vacuum of 27 inches of mercury to a thin syrupy consistency. The volume was estimated at about 40 milliliters. This concentrate was treated with 200 milliliters of acetone to precipitate the proteolytic enzymes as a flocculent white mass. The proteolytic enzymes were separated by suction filtration and washed wtih a small quantity of acetone. Vacuum drying produced 1.08 grams of material which possessed 440 milk-clotting units of enzymatic activity.

*Example 2.*—The top was cut out of a mature papaya tree and portions of the leaves, stems, and trunk were chopped in a food chopper. Two kilograms of the macerated pulp plus drippings were placed in a cloth bag and pressed in a stainless steel fruit press. Approximately 780 milliliters of green press liquid were obtained having a pH very close to 6. One liter of extraction solution containing 1 gram of sodium bisulfite, 4.5 milliliters of ammonium sulfide solution (22% $(NH_4)_2S$), and enough sodium hydroxide to adjust the pH to 8.5 was used to rewet and thus extract the pressed pulp. The mass was thoroughly mixed and then passed through the food chopper. Upon pressing, almost 1200 milliliters of green press liquor was obtained. A portion of the pulp was dried in an oven maintained at 103° C. to produce a sample of papaya pulp of good green color, which was assayed to contain 10.2% crude protein. The press cake was found to contain 68.2% moisture. The two portions of green press liquors were combined for the heat and enzymatic digestion to solubilize and activate the proteolytic enzymes and to clarify the solution. The pH of the combined green liquors was 8.0 and was adjusted downward to 4.0 by adding dilute sulfuric acid. The solution was mechanically agitated and heat applied to slowly raise the temperature to about 40° C. where it was maintained for 1 hour. Some evidence of the protein break was observed after about 10 minutes, and by the end of the digestion the green coagulum was well formed. It was removed by adding a small amount of filter aid and filtering with suction, and the filter cake washed with a small quantity of distilled water. The filtrate was yellowish orange, and had a volume of 2440 milliliters. This was concentrated in vacuum to about 400 milliliters and 2 liters of acetone added to precipitate the proteolytic enzymes as a light tan colored flocculent mass. The proteolytic enzymes were separated by filtration and dried in vacuum. The material was tan colored, but grinding produced a light colored product. The yield was 2.81 grams which were found to have 385 milk-clotting units of enzyme activity per gram.

*Example 3.*—The top of young papaya plant weighing 725 grams was cut into pieces small enough to immerse in a portion of extraction solution containing 0.1% sodium bisulfide, 0.1% potassium thiocyanate. After dipping in the extraction solution, the excess solution was allowed to drain off and the pieces then chopped and macerated in the food chopper. The pulpous mass along with all expressed juices were placed in a cloth bag and pressed to obtain 370 milliliters of green liquor. The pressed pulp was rewet with 400 milliliters of the above extraction solution and after thoroughly mixing and kneading it was again pressed to obtain 40 milliliters of green liquor. About 325 grams of pressed pulp was placed in an oven and dried at 103° C., to produce about 220 grams of papaya pulp which assayed to contain 1.25% oil soluble chlorophyll and 170,000 International Units of provitamin A. It was also found to contain 2.5% nitrogen or over 15% crude protein, using the conventional conversion factor of 6.25. The green liquors were combined and the enzymic digestion conducted. The pH was adjusted to 4.0 by adding dilute hydrochloric acid. Agitation was started and the mixture was heated to 38° C. in about 10 minutes, at which time the "break" could be seen. The heating was continued until the temperature reached 50° C. and maintained at this temperature for about 30 minutes, by which time the green coagulum was well formed. The green coagulum was separated by centrifugation and a yellowish colored clear centrifugate obtained. A small quantity of activated carbon was added and the solution maintained at 50° C. with agitation for 10 minutes. The activated carbon was removed by suction filtration, and a light straw colored solution collected. The clarified and purified proteolytic enzyme containing solution was concentrated under vacuum (27 in. Hg) to a syrupy consistency. Its volume was estimated at about 150 milliliters and 750 milliliters of 95% ethanol added to produce a light tan flocculent precipitate. This was allowed to settle for some time and most of the mother liquor was decanted. The precipitated proteolytic enzymes were mixed with 150 milliliters of fresh ethanol and separated by suction filtration and finally washed with a small portion of absolute ethanol. Final drying in vacuum produced 1.22 grams of light tan material that was found to 420 milk-clotting units of enzyme activity.

*Example 4.*—Two full grown papaya leaves weighing 260 grams were chopped and pressed to obtain 40 milliliters of green liquor. The pressed pulp was rewet and thoroughly mixed with 100 milliliters of extraction solution containing 0.15 gram ammonium sulfide and 0.1 gram sodium chloride and again chopped and pressed. This time 120 milliliters of green liquor were obtained, whose pH was 7.9. The pressed pulp weighing 129 grams was dried to yield about 35 grams of deep green colored papaya pulp. Chemical assay showed that it contained about 2% chlorophyll. It was a good source of carotene since it was found to contain in excess of 200,000 I.U. units of provitamin A per pound. The crude protein content was about 30% and the crude fiber was about 5%. The green liquors were combined and digested as follows. The pH was lowered to 4.2 by adding dilute hydrochloric acid and the temperature raised to 30° C. Mild agitation was used. A definite break could be seen after about 5 minutes, and the heating and stirring were continued until a temperature of 40° C. was reached. This took about 10 minutes and a good break had been effected. Temperature was maintained at this point for another 30 minutes. Filter aid and activated carbon were added and stirring continued for another 10 minutes, then filtered with suction. A light clear yellowish-orange colored filtrate was obtained, which was reduced to about 20 milliliters under reduced pressure (about 27 in. Hg). To this thin syrup was added about 40 milliliters of a saturated solution of ammonium sulfate to produce a precipitate. This solution was cooled about 34° F. and let stand for several hours before the precipitated proteolytic enzymes were separated by filtration. The precipitate was first washed with a small quantity of ice water and then with absolute alcohol, before final drying. The recovered enyzmes were tan colored, quite active in clotting milk, and weighed 0.43 gram. The green coagulum containing filter aid and carbon was found to be a suitable source chloroplyll, carotene, and xanthophyll.

*Example 5.*—A single young papaya plant weighing 632 grams was chopped in a mechanical chopper fitted with a tapered screw and cutter. The macerated mass was placed in a cloth bag along with the small quantity of expressed plant juices, and then pressed in a screw press to yield 324 milliliters of green liquor. The enzymatic activity of this expressed green liquor was found to be very low as assayed by the milk-clotting test. The pulp was rewet with an extraction solution containing 0.1% ammonium sulfide and 0.1% sodium chlorine by using 400 milliliters. After thoroughly mixing, the mass was again passed through the chopper and mechanically pressed to obtain about 420 milliliters of green liquor. A sample of this solution was assayed to have about twice the milk-clotting activity as the first green liquor obtained. The green liquors were combined and subjected to an enzymatic digestion to further free and activate the proteolytic enzymes. The pH was raised to 8.5 through the use of dilute sodium hydroxide, agitation was started and the temperature raised to 35° C., at which time the pH was lowered to 4.0 by adding dilute hydrochloric acid. These operations required about 15 minutes. The temperature was then raised to 40° C. and the first signs of the separation or break were observed. The heating was continued for another 5 minutes, by which time the temperature had gone up to 50° C. The temperature was maintained at this temperature for some 25 minutes, by which time a good break could be seen clearly. The solution was centrifuged to separate the green coagulum and a light orange solution was obtained. The green coagulum was rich in chloroplasts and a good grade of oil soluble chlorophyll could be extracted. It also was found to be a satisfactory source of the papaya alkaloid carpaine (the description of the process employed for its isolation will be given in an additional disclosure). Approximately 7 grams of green coagulum were obtained upon drying. The clarified centrifugate was then treated with 10 grams of activated carbon for about 10 minutes to remove more impurities, especially the color was improved. The clarified and purified solution was tested for milk clotting activity and found to be very active. The solution was concentrated to a syrup by means of vacuum evaporation. Its volume was estimated and five volumes of isopropanol were added to effect precipitation of the proteolytic enzymes. This mixture was placed in the refrigerator over night and the clear supernatant liquor decanted. The flocculent somewhat gummy precipitate was separated on a suction filter and washed with cold isopropanol, and then dried. A yield of 0.45 gram of light colored material was obtained having good milk-clotting proteolytic enzymic activity.

*Example 6.*—Two small papaya plants that had been dipped in a water solution containing 0.1% sodium sulfite for preservation were weighed some 90 minutes later and found to weigh 838 grams. These were chopped in the mechanical chopper-grinder and the macerated mass along with the expressed plant juices were mixed with 2 liters of water containing 0.1% sodium sulfite and 0.2% sodium polyphosphate and the mixture agitated for a few minutes, during which time the pH was found to be 7.1 which was raised to 8 through the addition of dilute ammonium hydroxide. Hydrogen sulfide was then passed through the agitated mixture until saturated and held for some 20 or 30 minutes. The mixture was then transferred to a cloth bag and mechanically pressed to obtain 1,410 milliliters of green press liquor. This solution was found to be quite active in clotting milk, but it was further activated and clarified by further enzymatic digestion. The pH was lowered to 4.25 by adding dilute phosphoric acid and the temperature increased to 40° C. to effect the first signs of a break or separation. Heating and stirring were continued for another 10 minutes to reach 55° C. and maintained there for another 20 minutes. About 20 grams of filter aid and 20 grams of activated carbon were added and the heat treatment continued for 20 minutes. Filtration produced a light tan clear filtrate which was concentrated under vacuum to a thin syrup. Addition of 5 volumes of acetone produced an almost white flocculent precipitate which was separated by suction. Contact of the precipitated proteolytic enzymes with moist warm air at this point caused a darkening in color and somewhat of a gummy appearance. Treatment with absolute ethanol removed the gumminess. Upon drying 0.67 gram of light tan colored material was recovered and assayed to have a high proteolytic activity as measured by the milk-clotting test.

*Example 7.*—Several young papaya plants between 1½ and 3 feet tall were cut about 10 inches above the ground level. Within two weeks each corm (corms are the roots plus the trunk remaining after cutting off all stems, branches, leaves, etc.) had put out new tops that later formed trunks, stems and leaves. Some corms put out more than one new top and these were cut off in most cases. As many as twelve new tops have thus been obtained from a single root or corm. These plants were crushed and chopped in a stainless steel food chopper to form a thoroughly macerated mass. Eight hundred grams of this mass were placed in a press and enough pressure applied to express 432 milliliters of a green colored liquor which was found to contain 8.1% suspended and dissolved solids. The proteolytic enzyme activity as measured by the standard milk-clotting test was quite low. The green liquor was subjected to an enzymatic digestion to liberate and otherwise activate the proteolytic enzymes, and at the same time to clarify and purify the solution to effect a satisfactory recovery of desired enzymes. The pH of the original green liquor was raised from its value of 5.9 to 8.5 by adding dilute sodium hydroxide. Then 0.5 gram of sodium sulfite and 0.5 gram of tetrasodium diethylenetetraamino acetate were added and the mixture stirred for 10 minutes. The pH was then lowered to 4.4 by adding a dilute solution of acetic acid. Agitation and heating were started, and the temperature slowly raised to 40° C. where it was held until a visible separation of the green coagulum could be seen. This required some 30 minutes. The temperature was increased to 50° C. where it was held for another 20 minutes, at which time a good separation had been effected, and a test of the mixture showed its milk-clotting activity had increased several fold. The solution was centrifuged to separate the green curdled mass, or coagulum, which upon drying was found to weigh 8.9 grams. Subsequent tests showed it to be a good source of carpaine, protein, chlorophyll, carotene, and xanthophyll. The centrifugate was further purified by treating with 20 grams of activated carbon, and 20 grams of filter cel, stirring for 10 minutes and then filtering. The purified and decolorized solution was concentrated under vacuum to a syrup and the proteolytic enzymes precipitated by adding five volumes of acetone. The flocculent precipitate was recovered by filtration and the acetone saved for recovery by simple distillation. Upon drying the precipitate it was found to weigh 0.64 gram. It was tan colored and fairly active in the milk-clotting test.

What is claimed is:
1. A method of treating papaya plants to recover proteolytic enzymes comprising the steps of, treating the plants with an extraction solution, pressing the treated plants to obtain a liquid from the plants, adjusting the pH of the liquid to 4.0–4.5, heating the liquid to between 40°–55° C. and digesting the heated liquid until a coagulate is formed therein, separating the liquid from the coagulate, purifying the liquid, concentrating the purified liquid, and treating the concentrated liquid to separate the proteolytic enzymes therefrom.

2. A method of treating papaya plants to recover proteolytic enzymes comprising the steps of, chopping the papaya plants, wetting the surfaces of the chopped plants with an extraction solution, pressing the wetted plants to obtain a liquid from the plants, rewetting the resulting plant pulp with additional extraction solution, pressing the rewet pulp to obtain additional liquid, combining the liquids from the pressing operations, dehydrating the pulpous plant mass, adjusting the pH of the combined liquids to between 4.0–4.5, heating the liquids to between 40°–55° C. and digesting the heated liquids to form a coagulate therein, clarifying the liquids by separating the coagulate from the liquids, purifying the liquid, concentrating the liquid, and separating the proteolytic enzymes therefrom.

3. A method of treating papaya plants to recover proteolytic enzymes comprising the steps of, treating the plants with an extraction solution, pressing the treated plants to obtain a liquid from the plants, adjusting the pH of the liquid to 4.0–4.5, heating the liquid to between 40°–55° C. and digesting the heated liquid until a coagulate is formed therein, separating the liquid from the coagulate, and treating the liquid to separate the proteolytic enzymes therefrom.

4. A method of treating papaya plants to recover proteolytic enzymes comprising the steps of, chopping the papaya plants, wetting the surfaces of the chopped plants with an extraction solution, pressing the wetted plants to obtain a liquid from the plants, rewetting the resulting plant pulp with additional extraction solution, pressing the rewet pulp to obtain additional liquid, combining the liquids from the pressing operations, dehydrating the pulpous plant mass, adjusting the pH of the combined liquids to between 4.0–4.5, heating the liquids to between 40°–55° C. and digesting the heated liquids to form a coagulate therein, and separating the proteolytic enzymes therefrom.

5. A method of treating papaya plants to recover proteolytic enzymes comprising the steps of, treating the plants with an extraction solution including a reducing agent, papain activator, and a solubilizing agent, pressing the treated plants to obtain a liquid from the plants, adjusting the pH of the liquid to 4.0–4.5, heating the liquid to between 40°–55° C. and digesting the heated liquid until a coagulate is formed therein, separating the liquid from the coagulate, and treating the liquid to separate the proteolytic enzymes therefrom.

6. A method of treating papaya plants to recover proteolytic enzymes comprising the steps of, chopping the papaya plants, wetting the surfaces of the chopped plants with an extraction solution including a reducing agent, papain activator, and a solubilizing agent, pressing the wetted plants to obtain a liquid from the plants, rewetting the resulting plant pulp with additional extraction solution, pressing the rewet pump to obtain additional liquid, combining the liquids from the pressing operations, dehydrating the pulpous plant mass, adjusting the pH of the combined liquids to between 4.0–4.5, heating the liquids to between 40°–55° C. and digesting the heated liquids to form a coagulate therein, and separating the proteolytic enzymes therefrom.

7. A method of treating papaya plants to recover proteolytic enzymes comprising the steps of, treating the plants with an extraction solution including a reducing agent, papain activator, and a solubilizing agent, pressing the treated plants to obtain a liquid from the plants, adjusting the pH of the liquid to 4.0–4.5, heating the liquid to between 40°–55° C. and digesting the heated liquid until a coagulate is formed therein, separating the liquid from the coagulate, purifying the liquid, concentrating the purified liquid, and treating the concentrated liquid to separate the proteolytic enzymes therefrom.

8. A method of treating papaya plants to recover proteolytic enzymes comprising the steps of, chopping the papaya plants, wetting the surfaces of the chopped plants with an extraction solution including a reducing agent, papain activator, and a solubilizing agent, pressing the wetted plants to obtain a liquid from the plants, rewetting the resulting plant pulp with additional extraction solution, pressing the rewet pulp to obtain additional liquid, combining the liquids from the pressing operations, dehydrating the pulpous plant mass, adjusting the pH of the combined liquids to between 4.0–4.5, heating the liquids to between 40°–55° C. and digesting the heated liquids to form a coagulate therein, clarifying the liquids by separating the coagulate from the liquids, purifying the liquid, concentrating the liquid, and separating the proteolytic enzymes therefrom.

9. The process of claim 5 wherein the extraction solution reducing agent is taken from any of the following: the sulfites and bisulfites of sodium and potassium, sulfur dioxide, sulfides and hydrosulfides of ammonium, sodium, and potassium, hydrogen sulfide, glutathionine, methionine, cysteine, thioglycolates, and cyanides, and wherein the papain activator is taken from any of the following: sulfites of sodium and potassium, sulfides of sodium and potassium, bisulfites of sodium and potassium, hydrosulfides of ammonium, sodium and potassium, diethylenetetra amino acetic acid and its soluble salts, hydrocyanic acid and its sodium and potassium salts, and wherein the solubilizing agent is taken from any of the following: chlorides of sodium and ammonium, phosphates of sodium and ammonium, meta and polyphosphates of sodium and potassium, sodium citrate, and hydrotropic agents including sodium benzene sulfonate and sodium paracymene sulfonate.

10. The process of claim 6 wherein the extraction solution reducing agent is taken from any of the following: the sulfites and bisulfites of sodium and potassium, sulfur dioxide, sulfides and hydrosulfides of ammonium, sodium, and potassium, hydrogen sulfide, glutathionine, methionine, cysteine, thioglycolates, and cyanides, and wherein the papain activator is taken from any of the following: sulfites of sodium and potassium, sulfides of sodium and potassium, bisulfites of sodium and potassium, hydrosulfides of ammonium, sodium and potassium, diethylenetetra amino acetic acid and its soluble salts, hydrocyanic acid and its sodium and potassium salts, and wherein the solubilizing agent is taken from any of the following: chlorides of sodium and ammonium, phosphates of sodium and ammonium, meta and polyphosphates of sodium and potassium, sodium citrate, and hydrotropic agents including sodium benzene sulfonate and sodium paracymene sulfonate.

11. The process of claim 1 wherein the pH of the liquid is adjusted by the addition of any of the following: hydrochloric acid, sulfuric acid, citric acid, acetic acid and phosphoric acid.

12. The process of claim 2 wherein the pH of the liquid is adjusted by the addition of any of the following: hydrochloric acid, sulfuric acid, citric acid, acetic acid and phosphoric acid.

13. The process of claim 3 wherein the pH of the liquid is adjusted by the addition of any of the following: hydrochloric acid, sulfuric acid, citric acid, acetic acid and phosphoric acid.

14. The process of claim 4 wherein the pH of the liquid is adjusted by the addition of any of the following: hydrochloric acid, sulfuric acid, citric acid, acetic acid and phosphoric acid.

15. The process of claim 5 wherein the pH of the liquid is adjusted by the addition of any of the following: hydrochloric acid, sulfuric acid, citric acid, acetic acid and phosphoric acid.

16. The process of claim 6 wherein the pH of the liquid is adjusted by the addition of any of the following: hydrochloric acid, sulfuric acid, citric acid, acetic acid and phosphoric acid.

17. The process of claim 7 wherein the pH of the liquid is adjusted by the addition of any of the following: hydrochloric acid, sulfuric acid, citric acid, acetic acid and phosphoric acid.

18. The process of claim 8 wherein the pH of the liquid is adjusted by the addition of any of the following: hydrochloric acid, sulfuric acid, citric acid, acetic acid and phosphoric acid.

19. The process of claim 5 wherein the extraction solution reducing agent is taken from any of the following: the sulfites and bisulfites of sodium and potassium, sulfur dioxide, sulfides and hydrosulfides of ammonium, sodium, and potassium, hydrogen sulfide, glutathionine, methionine, cysteine, thioglycolates, and cyanides, and wherein the papain activator is taken from any of the following: sulfites of sodium and potassium, sulfides of sodium and potassium, bisulfites of sodium and potassium, hydrosulfides of ammonium, sodium and potassium, diethylenetetra amino acetic acid and its soluble salts, hydrocyanic acid and its sodium and potassium salts, wherein the solubilizing agent is taken from any of the following: chlorides of sodium and ammonium, phosphates of sodium and ammonium, meta and polyphosphates of sodium and potassium, sodium citrate, and hydrotropic agents including sodium benzene sulfonate and sodium paracymene sulfonate, and wherein the pH of the liquid is adjusted by the addition of any of the following: hydrochloric acid, sulfuric acid, citric acid, acetic acid and phosphoric acid.

20. The process of claim 6 wherein the extraction solution reducing agent is taken from any of the following: the sulfites and bisulfites of sodium and potassium, sulfur dioxide, sulfides and hydrosulfides of ammonium, sodium, and potassium, hydrogen sulfide, glutathionine, methionine, cysteine, thioglycolates, and cyanides, and wherein the papain activator is taken from any of the following: sulfites of sodium and potassium, sulfides of sodium and potassium, bisulfites of sodium and potassium, hydrosulfides of ammonium, sodium and potassium, diethylenetetra amino acetic acid and its soluble salts, hydrocyanic acid and its sodium and potassium salts, wherein the solubilizing agent is taken from any of the following: chlorides of sodium and ammonium, phosphates of sodium and ammonium, meta and polyphosphates of sodium and potassium, sodium citrate, and hydrotropic agents including sodium benzene sulfonate and sodium paracymene sulfonate, and wherein the pH of the liquid is adjusted by the addition of any of the following: hydrochloric acid, sulfuric acid, citric acid, acetic acid and phosphoric acid.

21. A process of treating papaya plants to extract proteolytic enzymes therefrom including, wetting the plants with an extraction solution, pressing the wetted plants to separate the liquid from the pulp, adjusting the pH of the liquid to between 4.0–4.5, forming a coagulate in the liquid by heating it to between 40°–55° C. and digesting until the coagulate forms, separating the coagulate, and treating the remaining liquid to separate the proteolytic enzymes therefrom.

22. A method of recovering a coagulate from papaya plants which coagulate is a rich source of chlorophylls, carotenes, xanthophylls, carpaine and protein comprising the steps of, treating the plants with an extraction solution, pressing the treated plants to obtain a liquid from the plants, adjusting the pH of the liquid to 4.0–4.5, heating the liquid to between 40°–55° C. and digesting the heated liquid until a coagulate is formed therein, and separating the coagulate and liquid.

References Cited in the file of this patent

UNITED STATES PATENTS

| | | |
|---|---|---|
| 424,357 | Russell | Mar. 25, 1890 |
| 454,575 | Weber | June 23, 1891 |
| 1,959,750 | Wada | May 22, 1934 |
| 2,227,818 | Bayouth | Jan. 7, 1941 |
| 2,257,218 | Bails et al. | Sept. 30, 1941 |
| 2,313,875 | Jansen et al. | Mar. 16, 1943 |
| 2,909,869 | Dresser | Oct. 27, 1959 |
| 2,958,632 | Schwarz et al. | Nov. 1, 1960 |

OTHER REFERENCES

Chemurgic Digest, vol. 16, No. 7 (July 1957), pp. 4 to 6 and 12.